United States Patent [19]

Kunzli et al.

[11] 4,203,313

[45] May 20, 1980

[54] METHOD AND APPARATUS FOR THE EXPANSION OF A HOLLOW ARTICLE

[75] Inventors: Roland Kunzli, Mellingen; Keith Melton, Busslingen; Olivier Mercier, Ennetbaden, all of Switzerland

[73] Assignee: BBC Brown, Boveri & Company, Limited, Baden, Switzerland

[21] Appl. No.: 971,634

[22] Filed: Dec. 20, 1978

[30] Foreign Application Priority Data

Nov. 1, 1978 [CH] Switzerland .............................. 264/78

[51] Int. Cl.² .............................................. B21D 31/04
[52] U.S. Cl. ......................................... 72/364; 72/370; 72/391
[58] Field of Search ........................... 72/364, 370, 391

[56] References Cited

U.S. PATENT DOCUMENTS

| 442,604 | 12/1890 | Bray | 72/391 |
| 606,675 | 7/1878 | Marcy | 72/391 |
| 3,078,905 | 2/1963 | Somers et al. | 72/391 |
| 3,314,266 | 4/1967 | Werther et al. | 72/370 |

Primary Examiner—Lowell A. Larson
Attorney, Agent, or Firm—Oblon, Fisher, Spivak, McClelland & Maier

[57] ABSTRACT

A method and apparatus for the expansion of a hollow article out of a memory alloy, in which the hollow article, cooled below the transformation temperature, is mounted between two mandrels each having an opposing taper, and in a first phase is expanded on one face to the final dimension by one mandrel and is supported against a stop, whereupon the final shape is produced by pulling the other mandrel through the hollow article from the opposite face.

13 Claims, 3 Drawing Figures

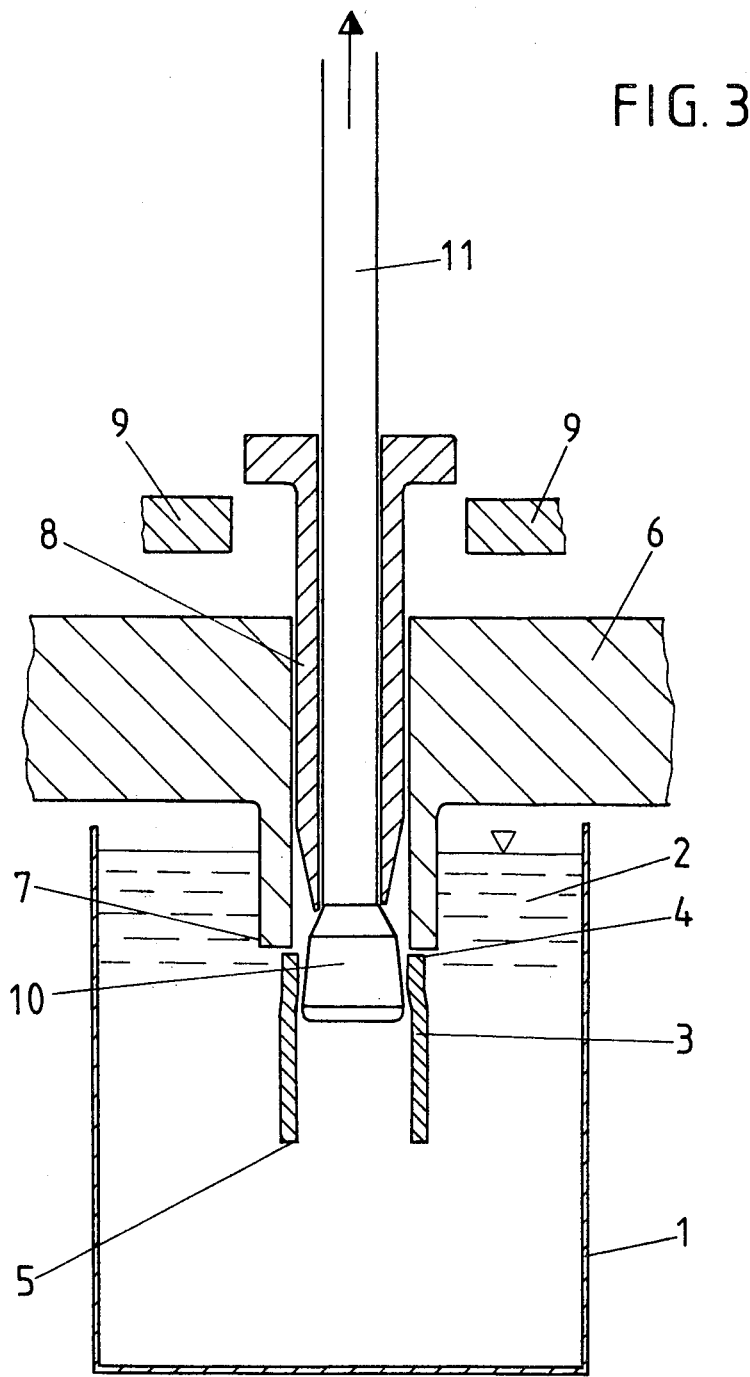

4,203,313

METHOD AND APPARATUS FOR THE EXPANSION OF A HOLLOW ARTICLE

BACKGROUND OF THE INVENTION

1. Field of the Invention

The invention is concerned with a process for the expansion of a hollow joining sleeve of a memory alloy.

The invention is further concerned with a device for the accomplishment of the process.

2. Description of the Prior Art

Hollow articles out of memory alloys can, because of their "shape memory" properties, be used as joining elements for semi finished products of all types such as wires, rods, tubes and profiles. For this purpose they must be expanded in the range of the low temperature phase, i.e. in the martensitic condition, by a certain amount which should not exceed a certain critical value. The current methods of stretching are known from the Standards (e.g. DIN 8585 sheet 3). It is further known (e.g. from DT-AS 20 65 651) that shrink fit joints can be made using a tube of a memory alloy. The workpieces to be joined were axially inserted into the tube which was expanded at low temperatures (such as $< -50°$ C.), whereby the latter on subsequent warming (for example up to room temperature) shrunk and pressed itself fully against the workpieces.

In the conventional stretching processes the hollow article is clamped by some means around its circumference (e.g. using jaws), or its front face is pressed onto a jig. As the properties of memory alloys depend very sensitively on the extent and the direction of the total applied deformation, i.e. on their "history", additional uncontrollable stresses and deformations are produced in the workpiece through such a process, which impairs its functional proficiency.

SUMMARY OF THE INVENTION

The object of this invention is to specify a process, as well as an apparatus, according to which a uniform controlled expansion of hollow articles out of a memory alloy is made possible, without troublesome side effects. In particular, the introduction of additional stresses and deformations endangering the strength and safety of the articles in service, should be strictly avoided.

According to the invention this is achieved by cooling the hollow article to the deformation temperature, and then first clamping it on its inner surface at both ends between two coaxial mandrels, each having an opposingly oriented taper and being adjustable towards each other along their axis, whereupon the hollow article is expanded into its final form initially at its end portions by a relative movement of the two mandrels towards each other and successively by completely forcing one of the mandrels through the hollow article by moving the mandrels together, whereby the hollow article is restrained and supported on one of its ends against a stop, and the thus expanded hollow article is discharged into the low temperature coolant used for cooling.

According to the invention the apparatus for carrying out the process is characterized by a container containing a low temperature coolant; two mandrels coaxially arranged and movable towards each other along their common axis, each having the cross-sectional shape of the hollow article to be deformed and a taper on one end. A worktable supporting a mandrel has a centering function and a stop for the article, and a drawing mechanism is provided in the form of a drawing bench or a press.

BRIEF DESCRIPTION OF THE DRAWINGS

Various other objects, features and attendant advantages of the present invention will be more fully appreciated as the same become better understood from the following detailed description when considered in connection with the accompanying drawings in which like reference characters designate like or corresponding parts throughout the several views, and wherein:

FIG. 3 shows a schematic longitudinal section through the apparatus shortly before the end of the third phase of deformation.

DETAILED DESCRIPTION OF THE PREFERRED EMBODIMENTS

Figure 1:
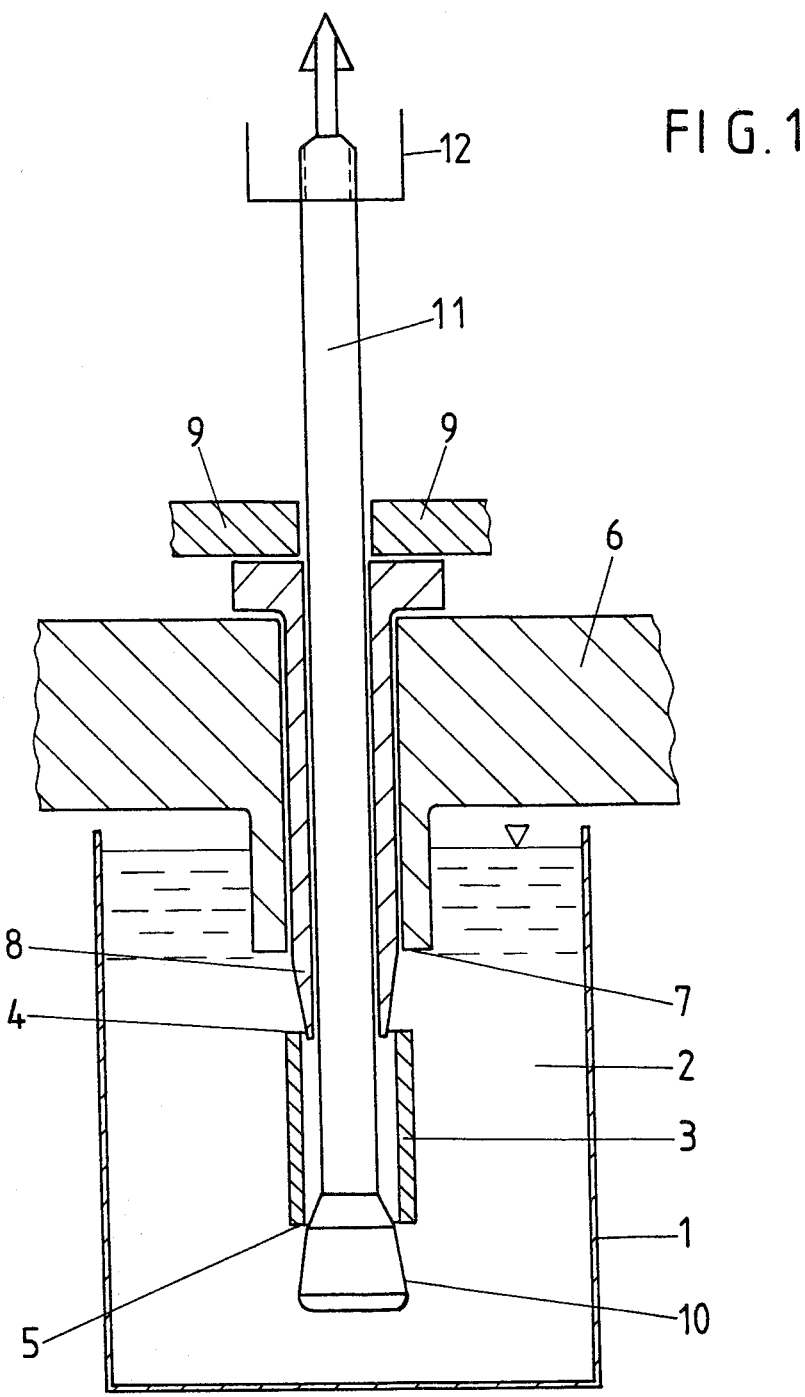
FIG. 1 shows a schematic longitudinal section through the apparatus, and the position of its components at the beginning of the first phase of deformation.

A schematic longitudinal section through the apparatus is shown in FIG. 1. In FIG. 1 the positions of the individual components correspond to the first phase of the process at the beginning of the deformation of the material.

In the process, a hollow article 3 is first mounted in the apparatus represented in FIG. 1. This apparatus has a container 1 for the low-temperature coolant 2, which may be liquid nitrogen ($-196°$ C.) or refrigerated alcohol ($< -50°$ C.). The base of the apparatus, taking the mechanical load, consists of a worktable having a borehole and stop 7 in which a hollow mandrel 8 is mounted in such a manner that it can be translated along its axis. At the beginning of the deformation phase the latter is prevented from moving and is fixed by the gripping device 9 against the worktable 6. The hollow mandrel 8 has a slight taper on its lower end, or, in the case of a circular hollow article 3, is slightly conical. Inside the mandrel 8 is guided the tension rod 11 which has an inner mandrel 10 at its lower end and is free to move along its axis. The tension rod 11 is in turn fixed to the pulling device 12 by a screw thread or other conventional methods (pin, clamping, jaws etc.). The mandrels 8 and 10 are made out of a cryogenic, non-brittle material which possesses both a high notch toughness and a high mechanical strength at low temperatures. An austenitic stainless steel may preferably be used. In order to reduce the friction during the deformation process of the hollow article 3, the mandrels 8 and 10 have highly polished surfaces. Any hollow body cross-sectional shape can be used, provided that it has a smooth inner surface.

The hollow article 3 having a desired tube shape is first put around the tension rod 11 in such a manner that its lower end 5 rests on the tapered area of contact of the inner mandrel 10. Thereby, the maximum cross-sectional dimension of the inner mandrel 10 corresponds to the required inner dimensions of the hollow article 3, taking into account the elastic springback of the latter. Then the tension rod 11 is screwed into the pulling device 12, after it has been pushed through the middle of the hollow mandrel 8. The pulling device 12 is now so adjusted that the upper end 4 of the hollow article 3 sits on the tapered area of contact of the hollow mandrel 8. The symmetrical starting position for the beginning of the deformation of the hollow article 3 is thus achieved. Particular care must be taken that the hollow article sits exactly coaxial with the axis of the mandrels 8 and 10 and is firmly mounted between them. After this preparation the part of the apparatus comprising the hollow article 3 and the mandrels 8 and 10 are cooled by lowering them into the container 1 filled with low-temperature coolant or lifting the container 1 towards the workpiece and tool. The hollow article 3 is thereby transformed into its martensitic phase. Through a further relative movement of the inner mandrel 10 towards the hollow mandrel 8 and the application of a corresponding tension force on the tension rod 11, the deformation process leading to the expansion of the hollow article 3 is started.

Figure 2:
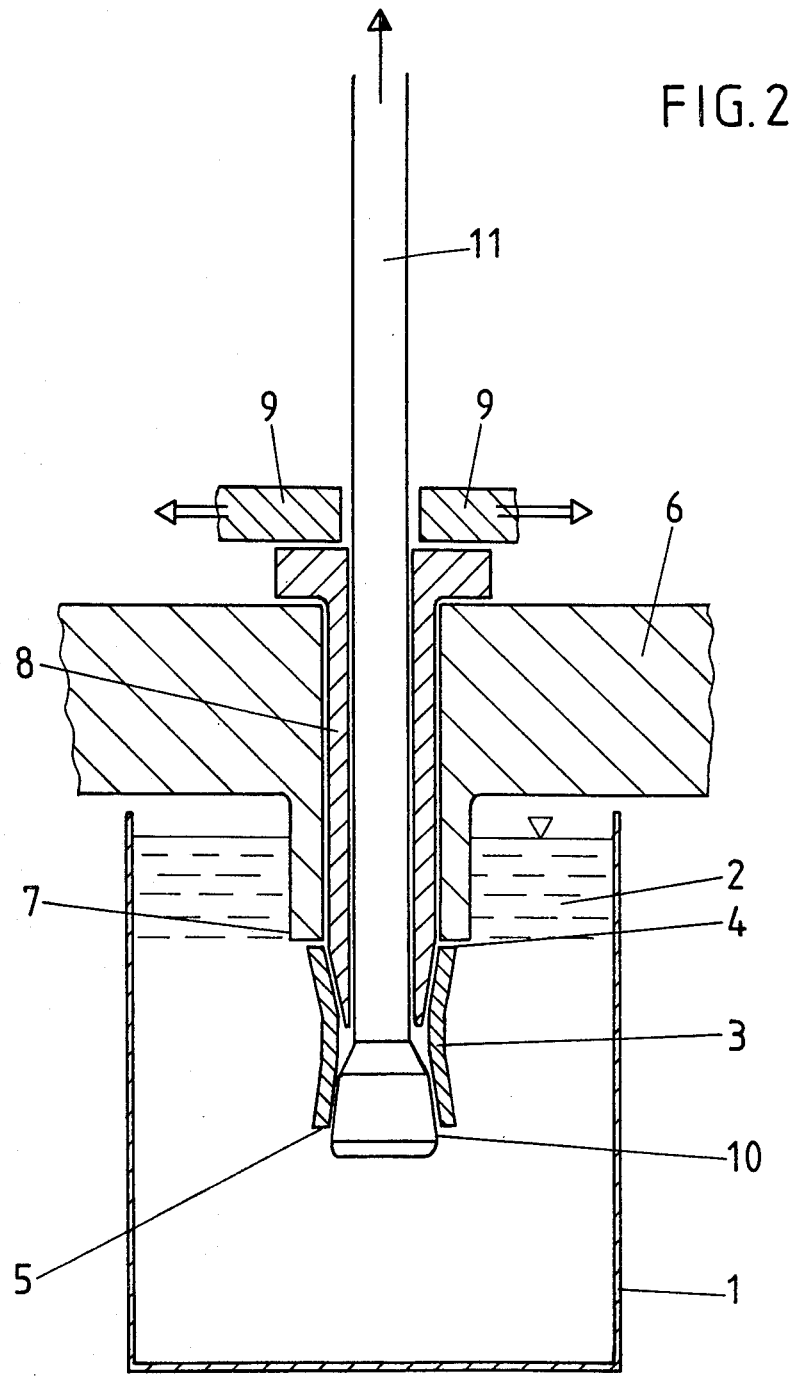
FIG. 2 shows a schematic longitudinal section through the apparatus at the moment of finishing the second phase of deformation.

FIG. 2 shows a schematic longitudinal section through the apparatus, portraying the second deformation phase. By the application of a tension force on the tension rod 11, the inner mandrel 10 is moved towards the hollow mandrel 8, fixed against the worktable 6 by the gripping device 9. Since the taper or the conicity of the hollow mandrel 8 is smaller than the corresponding dimensions of the inner mandrel 10, the region around the upper end 4 of the hollow article 3 is first expanded. Care should be taken here, as the deformation process of the upper end 4 must be completed before the latter comes to rest against the stop 7. The expansion of the region around the lower end 5 thus takes place with a certain delay. At the moment the expansion of the upper end of the hollow article 3 is finished, its upper end 4 comes to rest against the stop 7 and the deformation process in the lower part has begun, as represented in FIG. 2. The clamping device 9, which fixes the hollow mandrel 8 against the worktable, is subsequently laterally withdrawn so that the hollow mandrel 8 is free to move.

FIG. 3 shows a schematic longitudinal section through the apparatus shortly before the final stage of the deformation process. The clamping device 9 is moved sideways so that the hollow mandrel 8 can move upwards parallel to the tension rod 11, whereby the hollow mandrel 8 rests against the tapered englarging contact area in the inner mandrel. During the complete final phase of the expansion process the hollow article 3 is supported by the stop 7 such that its upper face 4 is subjected to practically no further lateral deformation. Additional stresses and damage are thereby avoided. As a consequence of the symmetric introduction of the deformation process on both the upper end 4 and the lower end 5 of the hollow article 3, a uniform state of stress over the complete length and cross section of the workpiece is achieved. After pulling the inner mandrel 10 completely through the hollow article 3, the latter falls onto the bottom of the container 1. The apparatus thus is again ready for the next working cycle.

EXAMPLE 1

First, a tube was made starting from a casting or a forged or rolled bar by use of known methods. This can be done by machining, by electro-erosion or by extrusion, where in general the choice is controlled by the economics of the method, the technical factors being equal. Any other conventional technique can be used for the manufacture of the tube. In the present Example 1, a tube was made from a casting by electro-erosion. The memory alloy used had the following composition:
Ti: 45.5 wt%
Ni: 43.0 wt%
Cu: 10.0 wt%
Fe: 1.5 wt%

Before the expansion, the cylindrical tube had the following dimensions:
outer diameter: 26 mm
inner diameter: 20 mm
wall thickness: 3 mm
length: 40 mm Liquid nitrogen ($-196°$ C.) was used as a coolant. The tension force on the tension rod 11 was 250 kg. The expansion of cylindrical tube 3 was 3.5% of the original diameter when the pulling speed was 4 mm/min.

EXAMPLE 2

A memory alloy of the following composition was used as starting material
Ti: 45 wt%
Ni: 43 wt%
Cu: 10 wt%
Fe: 2 wt%

This alloy has a martensitic transformation temperature $M_s$ of $-42°$ C. A casting weighing 6 kg, 220 mm long, 77 mm outer diameter and 19.2 inner diameter was first made. A cylindrical tube was made from this billet by extrusion at a temperature of 900° C. and then cut into sleeves. The dimensions of the sleeve were as follows:
outer diameter: 26.0 mm
inner diameter: 19.6 mm
wall thickness: 3.2 mm
length: 35.0 mm One of these sleeves, representing the hollow article 3, was slipped over the tension rod 11 and rested on the hollow mandrel 10, which had a maximum diameter of 20.38 mm. Hereupon the tension rod 11 was screwed into a drawing bench, serving as a pulling device 12 according to FIG. 1. The whole was then lowered into the container 1 containing alcohol at $-110°$ C. as low temperature coolant 2. After a cooling period of 12 min, during which the hollow article 3 and the inner mandrel 10 had practically reached the temperature of the cooled alcohol, the mandrel 10 was pulled upwards with a speed of 35 mm/min, whereby a pulling force of 350 kg was applied. The thus expanded hollow article 3 was finally slipped over two tubes of 20 mm outer diameter in order to join them together.

EXAMPLE 3

A cylindrical rod 200 mm long and of 18 mm diameter was cast from a memory alloy of a composition corresponding to that in Example 2, and then swaged down to a diameter of 12 mm at a temperature of 800° C. A piece was cut from this rod, its diameter turned down and a hole made by electro-erosion. The hollow article 3 then had the following dimensions
outer diameter: 10.5 mm
inner diameter: 7.9 mm
wall thickness: 1.3 mm
length: 14.0 mm This was then processed in a manner similar to that described in Example 2. The inner mandrel 10 had a maximum diameter of 8.24 mm, the coolant 2 was alcohol at $-120°$ C. The pulling speed of the mandrel 10 was 1 mm/min with a pulling force in the pulling rod 11 of 150 kg.

Obviously, numerous modifications and variations of the present invention are possible in light of the above teachings. It therefore to be understood that within the scope of the appended claims, the invention may be practiced otherwise than as specifically described herein.

We claim:

1. A process for expanding a joining sleeve formed from a hollow article, said process comprising the steps of:

mounting said hollow article between a pair of mandrels having opposing tapers and moveable towards each other, the inner surface of said hollow article being contacted at opposite ends by said mandrels;

inserting said mandrels and hollow article into a coolant until said hollow article reaches its deformation temperature; relatively moving said mandrels toward each other in said coolant to expand said ends;

moving one of said mandrels completely through said hollow article while supporting said hollow article in said coolant by a stop so as to completely expand said hollow article; and permitting said hollow article to remain in said coolant following the expansion by said mandrels.

2. A process according to claim 1 wherein one of said mandrels is hollow and the other said mandrel moves coaxially within said hollow mandrel.

3. An apparatus for expanding a joining sleeve formed from a hollow article, said apparatus comprising:

a container adapted to contain a low temperature coolant;

two coaxially disposed mandrels moveable towards each other along their common axis, said mandrels having opposing tapers at their ends;

support means for centering said mandrels in said container;

a hollow stop formed on said support means; and pulling means for providing relative movement between said mandrels.

4. The apparatus of claim 3 wherein one of said mandrels is hollow and said other mandrel includes a tension rod which is adapted to be guided within said hollow mandrel.

5. The apparatus of claim 4 wherein said taper of said hollow mandrel is shallower than said taper of said other mandrel.

6. The apparatus of claim 3, wherein said hollow article and said mandrel have a triangular cross-section.

7. The apparatus of claim 3 wherein said hollow article and said mandrel have a square cross-section.

8. The apparatus of claim 3 wherein said hollow article of said mandrel have a hexagonal cross-section.

9. The apparatus of claim 3 wherein said hollow article and said mandrel have a rectangular cross-section.

10. The apparatus of claim 3 wherein said hollow article and said mandrel have a octagonal cross-section.

11. The apparatus of claim 3 wherein said hollow article and said mandrel have an elliptical cross-section.

12. The apparatus of claim 3 wherein said hollow article and said mandrel have an oval cross-section.

13. The apparatus of claim 3 wherein said hollow article and said mandrels have a circular cross-section and in which said tapered ends of said mandrels form at least one conical section.

* * * * *